No. 736,464. Patented August 18, 1903.

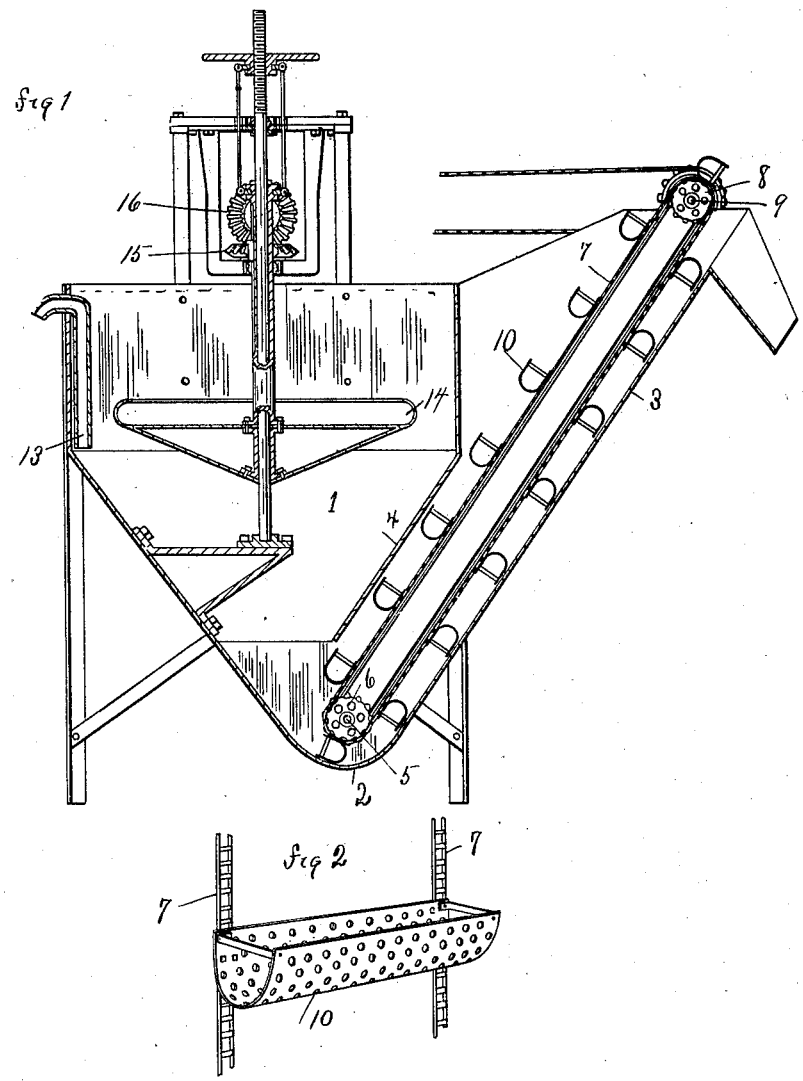

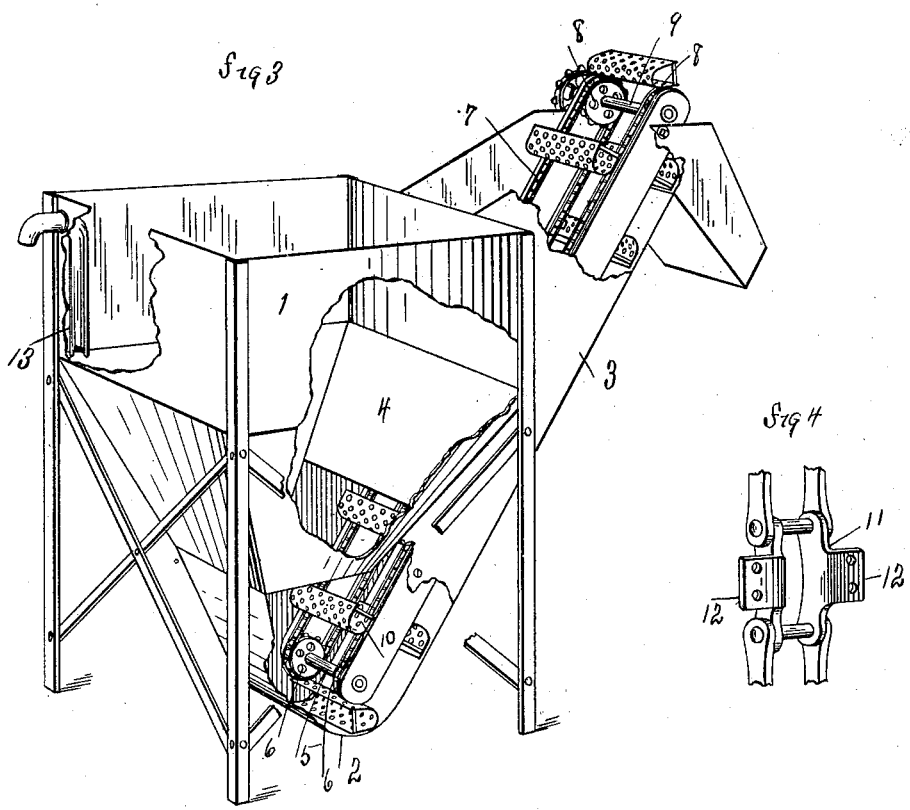

UNITED STATES PATENT OFFICE.

THOMAS F. TURNER AND HARRY B. STEWART, OF CANTON, OHIO.

GOLD-WASHING MACHINE.

SPECIFICATION forming part of Letters Patent No. 736,464, dated August 18, 1903.

Application filed July 15, 1901. Serial No. 68,400. (No model.)

*To all whom it may concern:*

Be it known that we, THOMAS F. TURNER and HARRY B. STEWART, citizens of the United States, residing at Canton, in the county of Stark and State of Ohio, have invented certain new and useful Improvements in Gold-Washing Machines; and we do hereby declare that the following is a full, clear, and exact description of the same, reference being had to the annexed drawings, making a part of this specification, and to the figures of reference marked thereon, in which—

Figure 1 is a vertical section. Fig. 2 is a detached view of one of the elevating-buckets, showing a portion of the chains. Fig. 3 is a perspective view. Fig. 4 is a view showing a portion of one of the elevating-chains and illustrating one of the bucket-connecting links.

The present invention has relation to gold-washing machines; and it consists in the peculiar construction hereinafter described, and particularly pointed out in the claim.

Similar numerals of reference indicate corresponding parts in all the figures of the drawings.

In the accompanying drawings, 1 represents the tank, which may be of the form shown—that is to say, the top or upper end thereof may be of the form shown—or it may be of any other desired form. The bottom or lower portion of the tank is formed tapering and its extreme bottom portion provided with the concaved bottom 2, which concave bottom is located and arranged substantially as shown and is so arranged for the purpose hereinafter described.

At one side of the tank 1 is located an inclined way 3, which inclined way leads from the concaved bottom 2 and is practically extended under the inclined bottom 4 of the tank 1, said inclined bottom 4 constituting a part of the main tank 1.

To the sides of the tank 1 or their equivalents is journaled the shaft 5, upon which shaft are mounted sprocket-wheels 6, around which sprocket-wheels 6 are located the chains 7, which chains extend upward and around sprocket-wheels 8, said sprocket-wheels being mounted upon the shaft 9, said shaft being properly journaled in any convenient manner.

To the sprocket-chains 7 are connected the elevating-buckets 10, which elevating-buckets 10 are formed of a length to correspond substantially with the width of the concave bottom 2, and for the purpose of removing the tailings from the tank 1 after the ore or gold-bearing substance has been treated for the separation of gold without removing the water contained in the tank the elevating-buckets 10 are perforated upon their sides and bottoms and formed with open ends, by which arrangement the tailings can be removed without disturbing the water contained in the tank and at the same time allowing the water escaping from the perforated and open-ended buckets to find its way back to the tank.

For the purpose of preventing the accumulation of tailings in the concave bottom of the tank 1 the shaft 5 is so located and the sprocket-wheels 6 mounted thereon formed of such a size that the movements of the buckets passing around the sprocket-wheels will move concentrically with the concaved bottom 2, thereby providing means for sweeping the entire surface of the concave bottom.

It will of course be understood that the concave bottom 2 is so curved that it will present a uniform curved surface, so that it will be concentric with the rotary movement of the buckets around the shaft.

For the purpose of providing a means for attaching the buckets to the elevating-chains a certain number of links 11 are provided, which links are connected to the chain and are provided with the flanges 12, said flanges being for the purpose of providing a means for connecting the bucket. In separating gold there is what is known as "floating gold," and when the water is removed from the top of the tank this gold is lost, but by our peculiar process the surface of the water remains practically the same and undisturbed, except when the gold-bearing substance is placed in the tank to be treated, the floating gold can be removed either by skimming or in any other convenient manner, such as an amalgamated plate floating upon the surface of the water or amalgamated wires or bars extended into the surface of the water, and for the purpose of preventing the water from escaping at the surface a pipe 13 is extended downward into the tank, which pipe is opened at its bottom or lower end and continues up and through the tank, thereby providing an overflow for the tank without taking the water from the surface.

It will be understood that by locating the outlet-aperture at a point below the normal surface of the water, any material floating upon the surface must in order to find its way out be carried down and then up in order to find its way out of the tank. We have illustrated a pipe 13 to accomplish this object, but we do not desire to be confined to this particular construction, as a partition may be provided, which is located over the outlet-aperture and extended below said outlet-aperture and below the normal surface of the water-line.

For the purpose of illustrating one way of separating gold from gold-bearing substance we have illustrated a horizontal rotating pan 14, said pan being located within the tank and is rotated by any suitable gear, such as the beveled wheels 15 and 16. This construction forms no particular part of the present process or invention, but is illustrated as one way of the many ways that may be employed in the separation of gold from the gold-bearing substance.

Our present invention relates particularly to the removing of the tailings from the bottom of the tank without removing therefrom the water and also leaving the surface of the water undisturbed, by which process we are enabled to maintain a supply of water without continuous flow of water from any source and at the same time save the floating gold that may accumulate upon the surface of the water contained in the tank.

Having fully described our invention, what we claim as new, and desire to secure by Letters Patent, is—

The combination of a tank with an upper outlet-passage, said upper outlet-passage extended into the tank to a point below the surface of the water in the tank, said tank provided with a concave bottom, elevating-buckets located upon elevating-chains, and said elevating chains and buckets extended into the bottom of the tank and movable concentrically over the concave bottom, an inclined way extended from the concave bottom and a submerged centrifugal pan located in the tank, and means for rotating the centrifugal pan, substantially as and for the purpose specified.

In testimony that we claim the above we have hereunto subscribed our names in the presence of two witnesses.

THOMAS F. TURNER.
HARRY B. STEWART.

Witnesses:
 WM. SIMPSON,
 F. W. BOND.